United States Patent [19]
Boswinkle et al.

[11] 3,856,672
[45] Dec. 24, 1974

[54] CONTINUOUS WET OXIDATION SYSTEM FOR THE HOME

[75] Inventors: George Boswinkle; Robert Bradford Wheaton, both of St. Joseph, Mich.

[73] Assignee: Whirlpool Corporation, Benton Harbor, Mich.

[22] Filed: Dec. 4, 1972

[21] Appl. No.: 312,194

[52] U.S. Cl............ 210/63, 210/71, 210/73, 210/152, 210/181, 210/185, 165/154
[51] Int. Cl............................................. C02c 5/06
[58] Field of Search...... 165/143, 154, 156; 210/23, 210/63, 68, 71, 79, 106, 108, 152, 73, 181, 177; 219/303, 304

[56] References Cited
UNITED STATES PATENTS

| | | | |
|---|---|---|---|
| 2,521,960 | 9/1950 | Arvintz et al. | 219/303 |
| 2,798,228 | 7/1957 | Boester | 210/63 X |
| 2,906,509 | 9/1959 | Van der Wateren | 165/154 X |
| 3,060,118 | 10/1962 | Schoeffel | 210/63 X |
| 3,359,200 | 12/1967 | Gitchel et al. | 210/63 |
| 3,509,835 | 5/1970 | Dibelius et al. | 210/68 X |
| 3,638,793 | 2/1972 | Peck | 210/108 X |
| 3,654,148 | 4/1972 | Bradley | 210/23 |
| 3,711,381 | 1/1973 | Lagstrom | 210/152 X |
| 3,733,271 | 5/1973 | Olsen | 210/63 |

Primary Examiner—Charles N. Hart
Assistant Examiner—Robert H. Spitzer
Attorney, Agent, or Firm—Hill, Gross, Simpson, Van Santen, Steadman, Chiara & Simpson

[57] ABSTRACT

A continuous wet oxidation system for the home handles virtually all wastes arising out of normal habitation of a domestic dwelling place. Bathroom, toilet and organic kitchen wastes are collected in a common receptor, macerated to form an influent which is pumped through a hydraulic system including a reactor means to which thermal energy and compressed air may be selectively supplied to oxidize the wastes, thereby producing harmless gases, sterile residual ash, and clarified reusable water. The reactor means may be used in conjunction with a reverse osmosis filter to preliminarily remove water from the influent and/or a combined reactor-filter unit may be utilized whereby activated carbon acts as a filter which is selectively reactivated by oxidation of the retained waste.

11 Claims, 4 Drawing Figures

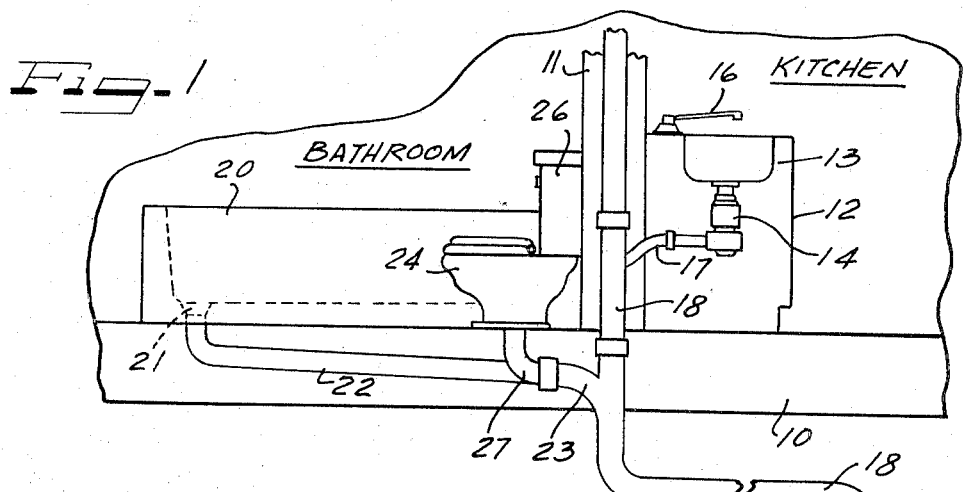
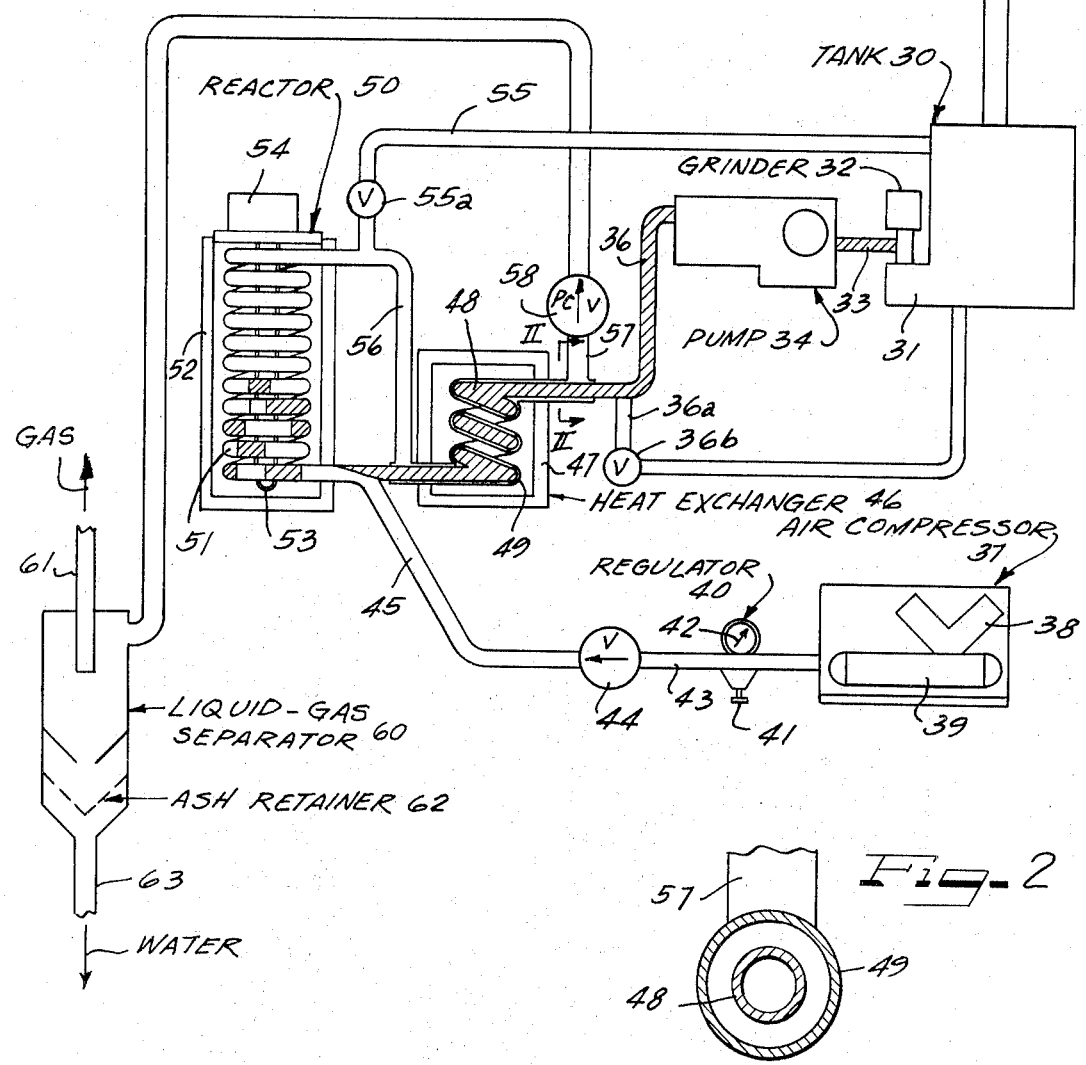

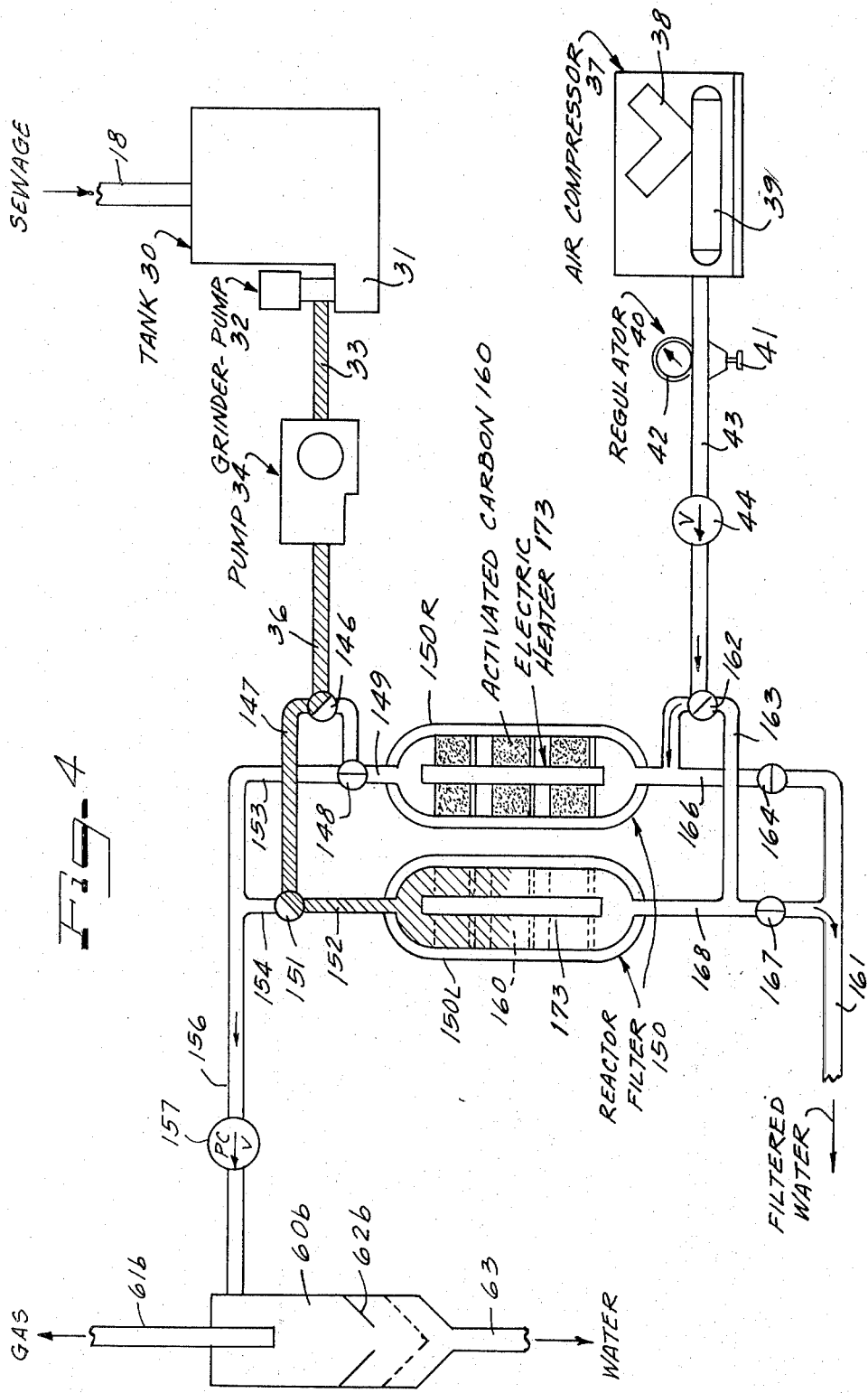

3,856,672

CONTINUOUS WET OXIDATION SYSTEM FOR THE HOME

BACKGROUND OF THE INVENTION

1. The Field of the Invention

This invention relates generally to waste disposal from small volume sources of organic waste such as the home.

2. The Prior Art

Wet oxidation systems are well known in connection with the handling and disposal of industrial and municipal wastes. Thus, the general process of wet oxidation is based on the prior art knowledge that any substance capable of burning can be oxidized in the presence of liquid water at increased temperatures, for example in excess of 250° F.

SUMMARY OF THE INVENTION

While the prior art abounds with industrial systems for wet oxidation, it is contemplated by the present invention that there be provided a method and means for handling waste, organic trash and garbage which is generated in the normal habitation of a home. Thus, it is contemplated that the materials normally handled by a garbage disposer, generally located in the kitchen sink, as well as the waste products from the bathroom, including the drainage from the bathtub and the materials normally flushed through a toilet and other organic waste material and trash including paper will be directed through a plumbing conduit in the house to a common receptor. The materials so flushed will then be macerated and mixed to form an influent which can be circulated through a hydraulic circuit. The influent is confined in the form of a stream and is directed through a reacting zone. In one form of the invention, the reacting zone is provided by a reactor characterized by a coil and a plurality of sheathed electrical resistance heating rods secured in intimate contact with the coil. Heat is added to the coil through the rods and the coil is of sufficient length to provide a residence time sufficient to complete oxidation of all organic solids when the influent is pumped therethrough at a prescribed rate in the presence of sufficient oxygen supplied under pressure. Thus, it is also contemplated that there be provided air compression means which may include a tank for storing compressed air and means for feeding the compressed air into the system such as pressure regulating means to meter the air flow at a rate proportional to the weight of solids in the influent.

Upon oxidation, the effluent leaving the reactor is separated into harmless gases which may be freely vented to the atmosphere, a small amount of sterile ash and a clarified supply of reusable water.

It is contemplated by the present invention to provide a heat exchanger in advance of the reactor through which the influent may be directed and through which the hot effluent is directed for adding thermal energy to the influent.

It is further contemplated by the present invention that a reverse osmosis filter be employed ahead of the reactor, if desired, thereby to remove water from the influent and increase the concentration of solids.

If desired, the entire reactor means can take the form of a combined reactor-filter arrangement utilizing beds of activated carbon. For example, two such units can be provided which are alternately operated, thereby to retain solid waste material by filtration and dissolved organic materials, colors and odors by adsorption. Switching means are provided for alternately switching the flow of influent to one or the other of the combined reactor-filter units, whereupon heating means selectively add heat to the units along with compressed air, thereby to wet oxidize the retained material and operating to reactivate the beds of activated carbon.

BRIEF DESCRIPTION OF THE DRAWINGS

FIG. 1 is a cross-sectional view of a typical home illustrating the various waste-generating means in a domestic environment and showing in the form of a hydraulic plumbing diagram the continuous wet oxidation system of the present invention.

FIG. 2 is a fragmentary sectional view taken substantially along line II—II of FIG. 1 to show the concentric tube structure, wherein the effluent serves to heat the organic waste influent while it is passing through the heat exchanger;

FIG. 4 is a view similar to FIGS. 1 and 3 showing a reactor means utilizing a combined reactor-filter arrangement.

DESCRIPTION OF THE PREFERRED EMBODIMENTS

Figure 3:
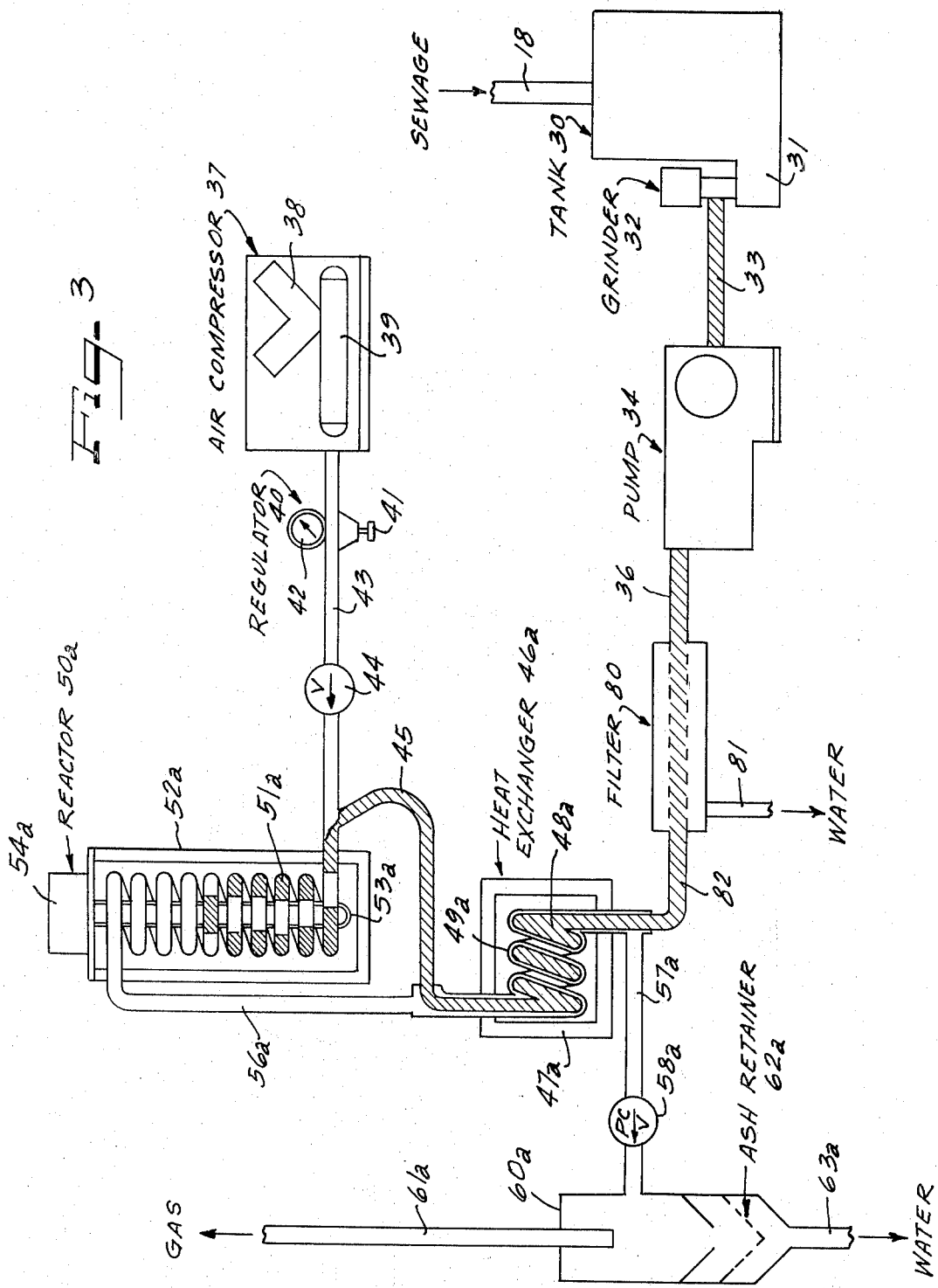
FIG. 3 is generally similar to FIG. 1 but shows a modified oxidation system wherein is utilized a reverse osmosis filter.

It should be understood that the present invention is specifically designed and intended for use in conjunction with a small volume source of organic waste such as in a home. Accordingly, while it is contemplated that the entire wet oxidation system would be normally confined within a compact unit preferably located closely adjacent to the home, for purposes of the present disclosure, the details of the continuous wet oxidation system have been expanded in the form of hydraulic plumbing circuits and each of such arrangements is disclosed in conjunction with the typical waste-generating means of a home.

Accordingly, there is shown in FIG. 1 an architectural construction which is only partially illustrated and includes a floor construction 10 and a wall construction 11 partitioning the interior of a home into rooms such as the kitchen and the bathroom. Typical domestic waste generators resulting from human habitation are illustrated. Thus, there is a kitchen counter 12 in which is located the bowl of a kitchen sink 13 equipped with a garbage grinder or kitchen waste disposer 14. The bowl of the sink 13 is supplied with water through a faucet 16 connected to the usual domestic supply and all of the waste water from the kitchen including the products ground up in the waste disposer or garbage grinder 14 are directed through a plumbing conduit 17 into a drain conduit shown at 18 and extending through the wall construction 11.

Likewise, in the bathroom space, there is shown a bathtub 20 having a drain 21 discharging through a plumbing conduit 22 connected to the same drain by a junction fitting 23.

A toilet is shown at 24 and is provided with a flush box 26 so that human wastes deposited in the toilet 24 can be flushed through a plumbing conduit 27 into the drain 18.

All of the household wastes generated in the home are thus directed to a common receptor via the plumbing drain 18 into a collecting tank 30. The collecting tank 30 has an outlet 31 in which is located a grinder 32 and for an average home installation may be sized to accept all of the sewage, waste water and organic waste generated by a single family of five people. The grinder 32 functions as a grinder-pump and operates to macerate the solids, thereby mixing the solid and liquid contents of the tank 30 to form an influent which can be passed through the hydraulic system provided in accordance with the principles of the present invention.

The influent is directed into a conduit 33. At one point in the system there is provided a system pump 34 for pumping the influent received from the grinder-pump 32 through the system at substantially a rate equal to the water consumption of the home and a system pressure range up to 800 psi above the vapor pressure of water at the reaction temperature which is the temperature in the reactor. In one embodiment of the invention which has performed satisfactorily with generation of a high quality effluent, the system pump pumped the influent received from the grinder-pump through the system at substantially 11 gallons per hour, at a system pressure range of from 1,500 to 1,600 psi, and with a reactor temperature of 560°F.

The influent directed under pressure from the pump 34 is discharged through a conduit 36.

In order to obtain sufficient oxygen to sustain a wet oxidation process, it is contemplated that there be provided an air compressor shown at 37. The air compressor will include an actual motor-operated compression means 38 and may include a storage tank 39 in which a supply of compressed air may be collected.

In order to selectively meter a supply of compressed air into the system, there is provided a pressure regulator shown at 40 having suitable adjustment and regulating means shown at 41 and an indicator 42 permitting selective adjustment and metering, to meter the air flow to up to 15 pounds of air per pound of solids in the influent. In one embodiment of the invention which performed satisfactorily with generation of a high quality of effluent, the air flow was adjusted to meter the air flow to 8.5 to 10 pounds of air per pound of solids in the influent.

The air conduit in which the regulator means is located is identified at 43 and includes a check valve 44. A conduit 45 connected with the portion of the coil 48 leading from the heat exchanger 46 to a coil 51 of a reactor shown at 50 is provided for supplying air to the reactor at a pressure equal to or greater than the system pressure and at a temperature in the order of the ambient temperature, to provide the required pressure and volume of air per pound of solids in the influent, to effect oxidation thereof as it is passing through the reactor 50.

With respect to all of the components and elements thus far described, such elements and components are common to the various forms of the invention illustrated herein. Accordingly, like reference numerals have been applied to like elements wherever possible in order to avoid duplication of description. It is contemplated in all forms of the invention that the influent discharged by the pump 34 and into the conduit 36 will be directed through some form of reactor means.

In the form of the invention illustrated in FIG. 1, the conduit 36 is connected to a heat exchanger 46. The influent enters the heat exchanger at the system pressure and at ambient temperature. A relief conduit 36a having a safety valve 36b therein is connected from the conduit 36 back to tank 30, to return the influent in the conduit 36 back to tank 30 upon excessive pressure conditions. The heat exchanger 46 is particularly characterized by an insulating housing 47 through which passes a double concentric coil including an inner coil or conduit 48 through which the influent is directed and an outer coil or conduit 49 surrounding the inner coil and affording an outer passage through which hot effluent is directed (see FIG. 2), thereby to place the hot effluent in direct thermal conductivity counter current flow relationship with the incoming influent and operating to add thermal energy to the influent on its way to the reactor. The system disclosed in FIG. 1 thus employs a tube-in-tube heat exchanger wherein there is gas free liquid flowing downward within the center tube in contact with the tube wall all of the way through the tube-in-tube heat exchanger.

In this form of the invention, the reactor as shown at 50 comprises a coil 51 contained within an insulated housing 52 which receives the influent from heat exchanger inner coil 48 and compressed air from conduit 45. Thus, air and liquid flow upward in the reactor. The temperature of the influent as it leaves the heat exchanger 46 and enters the reactor 50 may be of the order of 480°F. The length of the coil 51 is such as to provide a sufficient residence time in the reactor to afford substantially complete oxidation of the influent under prescribed conditions of heat and pressure and capacity of the system. For example, with a coil 51 having a diameter of 1 inch, substantially all organic solids will be oxidized within a coil residence time of 45 minutes or less. Actually it has been determined that almost 60 percent of the oxidation occurs practically instantaneously and in the arrangement illustrated in the drawings, a coil residence time of 15–20 minutes will be adequate. However, for substantially complete oxidation, a coil residence time of 45 minutes is considered best.

Associated with the coil 51 are a plurality of rods or tubes 53 disposed in thermally conductive relation to the coil 51 and receiving thermal energy from a heat source 54. It should be appreciated that the rods or tubes 53 could constitute electric heating elements in which event the heat source 54 would merely be a suitable connection to the usual domestic supply of electric energy. In the event that it should be desirable to use other forms of heat such as a heated fluid, for example, steam, then the rods or tubes 53 could be hollow and it will be understood that the heat source 54 would be correspondingly altered to constitute either a steam generator or a connection to a steam or other hot fluid source.

In FIG. 1, the reactor 50 has a discharge tube shown at 56 connected to the end of the coil 51 and receiving the oxidized influent at a temperature in the order of 560°F. The discharge tube 56 is, in turn, connected to the outer tube 49 of the heat exchanger 46. Thus, the effluent mixture enters the bottom of the heat exchanger and flows upward while the influent enters the top of the heat exchanger and flows downward. This provides for very effective heat exchange because when the air and water of the hot effluent mixture flows upward in tube 49 of the heat exchanger, the air and water tend to flow together, more than would be the situation if flow was downward, for improved contact between the hot effluent in tube 49 and tube 48 containing the relatively cool influent.

A return conduit 55 is connected from the tube 56 back to tank 30 and has a safety valve 55a therein, to relieve the reactor 50 and tube 56 upon excessive pressure conditions.

The tube 49 discharges the effluent after it has passed through the heat exchanger 46 into a conduit 57. Since the system may be under pressure, there is shown in the conduit 57 a pressure control valve 58. The oxidized products pass through pressure control valve 58 and conduit 57 at atmospheric pressure and at a temperature of between 100° to 160°F and are discharged through a liquid gas separator shown generally at 60. The liquid gas separator 60 includes a gas vent 61 operative to vent innocuous gases, mostly $CO_2$ to the atmosphere and an ash retainer 62 which will collect a small amount of sterile residual ash resulting from the oxidation process.

Clarified re-usable water is discharged out of the bottom of the liquid gas separator 60 as shown at 63. Such water can either be used in the home or can be disposed of for other utilitarian usages.

There has thus been described in connection with FIG. 1 a system affording an improved efficient method of handling waste, organic trash and garbage in a home so that all of the waste material may be flushed into the common receiving tank 30 and subjected to wet oxidation so that the resulting effluent may be separated into harmless gas, sterile residual ash and clarified water.

While the system of the present invention has been illustrated in conjunction with a single family dwelling in FIG. 1 for simplicity, it will be understood that the system of the present invention may be readily connected to handle the human waste, organic trash and garbage from a group of homes, or an apartment building, a motel, a restaurant, a small factory, a store, a recreational trailer park, a marina, a ship, or the like.

In FIG. 3 essentially the same general arrangement is provided. However, it will be noted that there is connected to the conduit 36 a reverse osmosis filter 80 which may be obtained from a conventional source. The purpose including the reverse osmosis filter 80 is to effect certain economies in the operation of the system. The filter 80 will concentrate the waste materials which are fed to the reactor by removing up to 80 percent of the water, thereby increasing the solids concentration in the influent approximately five-fold. Since it will then be necessary to heat only a reduced gallonage per day, to the increased temperatures required for the operation of the system and since one more heat will be realized per gallon of liquid oxidized from the oxidation of the concentrated solids, there will be a considerable economy in the operation of the reactor oxidizer. Also, the high pressure pump associated with conventional reverse osmosis filter systems is already provided in the present system. Further economies will be realized in the reduction of the size of the reactor. It will be appreciated that the flow rate through the reactor can be reduced materially and the length of the reactor coil can also be reduced commensurately without affectng the effective residency of the influent in the reacting zone.

A water drain from the reverse osmosis filter 80 is shown at 81 and the discharge conduit from the filter 80 is shown at 82.

In the arrangement of FIG. 3, the conduit 82 is connected to a coil in the heat exchanger here identified at 46a, the coil being identified at 48a. Since all of the other elements correspond in structure and function and are generally similar except for differences in size, as noted hereinabove, like reference numerals have been applied with the suffix a. It will also be appreciated that the supply of air is introduced into the system between the heat exchanger 46a and the reactor 50a.

In the arrangement of FIG. 4, the reactor means takes the form of a pair of reactor-filter units shown at 150 and including a first unit on the left shown at 150L and a unit on the right shown at 150R. In order to selectively switch between the two units, there is provided a switching valve 146 disposed in a branch conduit 147 leading a switching valve 148 in a conduit 149 connected to the right-hand unit 150R and a valve 151 located in a conduit 152 connected to the left-hand unit 150L.

The discharge side of the valve 148 is connected to a conduit 153 and the discharge side of the valve 151 is connected to a conduit 154. The conduits 153 and 154 are connected to a conduit 156 which has a pressure control valve 157 located therein.

Each of the reactor filter units 150L and 150R is characterized by the provision of beds of activated carbon 160. Thus, each unit in turn, acts as a filter passing the waste mixture through the plural beds of activated carbon 160. The solids are retained in the carbon beds by filtration and adsorption. Solid waste materials are retained by filtration, dissolved organic materials, color and odors are adsorbed in the carbon. Filtered water passes out of the system through a drain conduit 161.

In order to regulate the flow of air into the reactor-filter units, a first valve 162 is located in a branch conduit 163. A valve 164 is located in a conduit 166 and a valve 167 is located in a conduit 168. Accordingly, by manipulation of the switching valves which may be entirely automatic, if desired, the pair of reactor-filters can be selectively alternated. First one unit is employed as a filter (150L as shown in FIG. 4), and then in the next cycle the same unit is employed as a reactor to wet oxidize the collected organic material and to reactivate the carbon bed 160. While the left-hand unit 150L is acting as a filter as shown in FIG. 4, the right-hand unit 150R is employed as a reactor, and conversely. A heating means is provided for reactivating the carbon bed 160 for each unit, for example, an electric heater is shown at 173 thereby to permit thermal energy to be added and the temperature increased, for example, to approximately 550°F.

The air compressor 37 or the storage tank 39 supplies air at a pressure above system pressure through the pressure regulator 40 and the conduit 43 through the valve 162 and into a corresponding reactor-filter (150R as shown in FIG. 4) unit at a pressure of approximately 1,600 psi, thereby to elevate the pressure within the unit. The pressure control valve 157 beyond the reactor holds the pressure and allows the effluent gas to expand at reduced pressure. In the separator 60b, the harmless gases are passed up and out the vent stack 61b while fluid drops by gravity to a clean water outlet 63b and residual sterile ash is collected on the ash screen or ash retainer 62b.

In this mode, the organic material is oxidized out of the activated carbon beds 160, thereby reactivating the carbon beds 160. The chamber provided by the reactor filter unit is then allowed to cool before the influent stream is again diverted or directed into the chamber for filtration.

Although various minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privelege is claimed are defined as follows:

1. The method of handling waste, organic trash and garbage in a home, which includes the steps of:

flushing garbage disposers, toilets and other household appliances for receiving and gathering organic refuse, garbage and trash through a common hydraulic system formed by suitable plumbing means, thereby to collect the waste generated in the home as flushed material containing solid and liquid contents;

at one point in the system collecting the flushed material into a common receiving tank;

macerating and mixing the solid and liquid contents of the tank to form an influent which can be circulated through the system;

at a second point in the system metering a supply of pressurized air to support oxidation of the influent;

at a third point in the system pressurizing the influent by pumping to drive the influent in the form of a stream;

at a fourth point in the system confining the stream together with the air supplied thereto to flow through a heat transfer coil of substantial length and numerous loops in a reacting zone while adding radiant electrical thermal energy to the stream through the coil throughout the entire effective flow path length of the coil within the reacting zone such that a temperature in the order of 550°–560° F. is maintained throughout travel of the stream through the coil in the reacting zone and thereby oxidizing the solids during the residence of the stream in the reacting zone and forming a completely oxidized effluent within the reacting zone;

and separating effluent leaving the reacting zone into harmless gas, sterile residual ash and clarified water.

2. The method of claim 1, including the step of introducing the pressurized air into the stream of inluent after preheating the influent in a heat exchanger and before introducing the influent into the coil in the reacting zone.

3. The method of handling waste, organic trash and garbage in a home as defined in claim 1 and further characterized by the additional step of directing the hot effluent through a heat exchanger through which the influent is directed prior to supplying the air for oxidation, thereby to preheat the influent.

4. The method of claim 1 and further characterized by the step of passing the influent through a reverse osmosis filter to remove approximately 80 percent of the water from the stream prior to oxidation of the influent in the reacting zone.

5. A system for handling waste, organic trash and garbage in a home, comprising:

means for receiving and gathering organic refuse, garbage and trash such as flushings from garbage disposers, toilets and other household applicances and comprising a common hydraulic system provided by plumbing means;

means in the system for collecting the flushed material as solid and liquid contents and including a common receiving tank;

means for macerating and mixing the solid and liquid contents of the tank to form an influent which can be circulated through the system;

means for supplying pressurized air into the system after said macerating and mixing means to support oxidation of the influent;

means in the system for pressurizing the influent and pumping the influent to flow as a stream;

means providing a reacting zone having therein a heat transfer coil of substantial length and numerous loops through which the pressurized stream of influent together with the air supplied thereto is confined to flow;

means for supplying radiant electrical energy through the coil to the stream flowing therethrough throughout the entire effective flow path length of the coil within the reacting zone to heat the stream to a temperature in the order of 550° to 560° F. throughout the travel of the stream through the coil in the reacting zone for oxidizing the solids during the residence of the stream in the reacting zone to form a completely oxidized effluent within the reacting zone;

and means for separating the effluent after leaving the reacting zone into harmless gas, sterile residual ash and clarified water.

6. A system according to claim 5, including a heat exchanger through which the influent is directed prior to supplying air to the influent by said means for supplying pressurized air for oxidation, whereby to preheat the influent.

7. A system according to claim 5, including a reverse osmosis filter for removing approximately 80 percent of water from the stream and located downstream from the reacting zone.

8. A system according to claim 5, including a heat exchanger through which the influent stream is directed and which is located in the system before said pressurized air supplying means introduces the air into the stream of influent.

9. A system according to claim 5, including a tube-in-tube heat exchanger having an inner tube connected in said system between said pumping means and said coil to receive the influent on its way to the coil, and an outer tube surrounding the inner tube connected with outlet from the coil and leading to said separating means, and conducting the effluent in the heat exchanger in counter-current flow relationship to the influent stream in the inner tube, whereby the influent is efficiently heated by the effluent from the reacting means coil and the effluent is correspondingly cooled by the heat exchange thus effected.

10. Apparatus for handling waste, organic trash and garbage in a home, and comprising:

a conduit system provided with a common receiving tank in the system for collecting flushed material waste generated in the home and containing solid and liquid contents;

means for macerating and mixing the solid and liquid contents of the tank to form an influent which can be circulated through the system;

means for metering a supply of pressurized air to a point in the system for oxidation of the influent;

means in the system for pumping the influent to drive the influent as a stream through the system;

means providing a reacting zone comprising a pair of reactor filter units each having an elongated vertical bed of activated carbon for retaining solid waste material by filtration and disolved organic materials, colors and odors by adsorption;

switching means for alternately switching the stream of influent to one or the other of the filter units to flow in one direction therethrough and in the opposite direction through the other of the filter units, selectively;

means extending longitudinally through the bed of activated carbon in each of said filter units for heating the influent passing through the respective filter units by radiant electrical thermal energy throughout the entire effective flow path length through the units to a temperature in the order of 550° F. and operating to maintain such tmeperature throughout the travel of the influent through the units to oxidize solids during residence of the influent stream in the units to form a completely oxidized effluent before leaving the units;

and means for separating the effluent after leaving the units into harmless gas, sterile residual ash and clarified water.

11. Apparatus according to claim 10, wherein said means for metering a supply of pressurized air to the influent is located to introduce the air to the influent in passing from one of said units alternately to the other unit in either direction of flow of the influent from one unit to the other.

* * * * *